(12) United States Patent
Sahara

(10) Patent No.: US 12,038,529 B2
(45) Date of Patent: Jul. 16, 2024

(54) ELECTRONIC DEVICE, METHOD FOR CONTROLLING ELECTRONIC DEVICE, AND ELECTRONIC DEVICE CONTROL PROGRAM

(71) Applicant: KYOCERA Corporation, Kyoto (JP)

(72) Inventor: Tooru Sahara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 636 days.

(21) Appl. No.: 17/272,962

(22) PCT Filed: Sep. 3, 2019

(86) PCT No.: PCT/JP2019/034649
§ 371 (c)(1),
(2) Date: Mar. 3, 2021

(87) PCT Pub. No.: WO2020/050278
PCT Pub. Date: Mar. 12, 2020

(65) Prior Publication Data
US 2021/0190907 A1 Jun. 24, 2021

(30) Foreign Application Priority Data
Sep. 5, 2018 (JP) ................................. 2018-165795

(51) Int. Cl.
*G01S 7/35* (2006.01)
*G01S 13/42* (2006.01)
*G01S 13/931* (2020.01)

(52) U.S. Cl.
CPC ............. *G01S 7/354* (2013.01); *G01S 13/42* (2013.01); *G01S 7/356* (2021.05); *G01S 13/931* (2013.01)

(58) Field of Classification Search
CPC ...... G01S 13/93; G01S 13/931; G01S 13/343; G01S 7/354; G01S 7/356; G01S 13/42
See application file for complete search history.

(56) References Cited

U.S. PATENT DOCUMENTS 5,731,778 A * 3/1998 Nakatani ................. G01S 13/58
342/111
5,751,240 A * 5/1998 Fujita ...................... G01S 13/34
342/107

(Continued)

FOREIGN PATENT DOCUMENTS

| CN | 108226919 A | 6/2018 |
| JP | H07-311260 A | 11/1995 |

(Continued)

*Primary Examiner* — Peter M Bythrow
(74) *Attorney, Agent, or Firm* — Studebaker & Brackett PC

(57) ABSTRACT

An electronic device comprises a transmitting antenna that transmits a transmitted wave, a receiving antenna that receives a reflected wave obtained by reflection of the transmitted wave, and a controller. The controller generates a first sample based on a result obtained by subjecting a beat signal generated based on a transmitted signal based on the transmitted wave and a received signal based on the reflected wave to a first fast Fourier transform process. The controller generates a second sample based on a result obtained by subjecting the first sample to a second fast Fourier transform process, and estimates an arrival direction of the reflected wave based on the second sample. The controller sets the first sample from the beat signals in which the peak in the result obtained by performing the first fast Fourier transform process is equal to or higher than a first threshold value.

13 Claims, 8 Drawing Sheets

(56) References Cited

U.S. PATENT DOCUMENTS

| | | | |
|---|---|---|---|
| 8,441,395 B2 | 5/2013 | Kanamoto | |
| 8,907,840 B2 | 12/2014 | Kanamoto | |
| 10,222,470 B2* | 3/2019 | Addison | G01S 13/931 |
| 10,393,871 B2 | 8/2019 | Bilik et al. | |
| 10,551,488 B2* | 2/2020 | Cornic | G01S 13/584 |
| 10,718,862 B2 | 7/2020 | Asanuma et al. | |
| 2009/0073026 A1 | 3/2009 | Nakagawa | |
| 2013/0030769 A1* | 1/2013 | Asanuma | G01S 13/343 |
| | | | 702/189 |
| 2016/0131744 A1 | 5/2016 | Addison et al. | |
| 2018/0164423 A1 | 6/2018 | Bilik et al. | |
| 2018/0203107 A1* | 7/2018 | Asanuma | G01S 7/415 |
| 2018/0321368 A1* | 11/2018 | Bharadwaj | G01S 13/42 |
| 2019/0044485 A1* | 2/2019 | Rao | H03B 5/1212 |
| 2019/0377062 A1* | 12/2019 | Barkan | G01S 13/536 |
| 2020/0041610 A1* | 2/2020 | Longman | G01S 13/931 |
| 2021/0116536 A1* | 4/2021 | Brosche | G01S 13/34 |

FOREIGN PATENT DOCUMENTS

| | | |
|---|---|---|
| JP | 2009-014405 A | 1/2009 |
| JP | 2009-156807 A | 7/2009 |
| JP | 2009-162688 A | 7/2009 |
| JP | 2009-162689 A | 7/2009 |
| JP | 2010-066179 A | 3/2010 |
| JP | 2011-137650 A | 7/2011 |
| JP | 2012-163403 A | 8/2012 |
| JP | 2014-001943 A | 1/2014 |
| JP | 2016-109678 A | 6/2016 |
| JP | 2018-115936 A | 7/2018 |

* cited by examiner

ELECTRONIC DEVICE, METHOD FOR CONTROLLING ELECTRONIC DEVICE, AND ELECTRONIC DEVICE CONTROL PROGRAM

CROSS REFERENCE TO RELATED APPLICATION

This application claims the priority of Patent Application 2018-165795 filed in Japan on Sep. 5, 2018, and the entire disclosure of this previous application is hereby incorporated for reference.

TECHNICAL FIELD

The present disclosure relates to an electronic device, a method for controlling electronic device, and an electronic device control program.

BACKGROUND

For example, in the field of industries related to automobiles, technique for measuring the distance between an own vehicle and an object is important. In particular, in recent years, RADAR (Radio Detecting and Ranging) technique, that measures the distance between the own vehicle and the object by transmitting radio waves such as millimeter waves and receiving reflected waves from the object such as an obstacle, has been studied in various ways. The importance of technique for measuring such distances and the like is expected to grow more and more in the future with the development of techniques that assist drivers in driving and related to automated driving that automates a part or all of driving.

Further, a technique that measures (estimates) an arrival direction of the reflected wave by receiving a reflected wave obtained by reflection of the transmitted radio wave, have also been proposed in various ways. For example, PTL 1 and PTL 2 propose a radar technique that can accurately estimate the arrival wave direction. Further, PTL 3 and PTL 4, for example, propose a radar technique that can reduce the amount of data or arithmetic operation in estimating the arrival wave direction.

CITATION LIST

Patent Literature

PTL 1: JP 2009-162688 A
PTL 2: JP 2011-137650 A
PLT 3: JP 2009-162689 A
PTL 4: JP 2012-163403 A

SUMMARY

An electronic device according to an embodiment comprises a transmitting antenna that transmits a transmitted wave, a receiving antenna that receives a reflected wave obtained by reflection of the transmitted wave, and a controller. The controller generates a first sample based on a result obtained by subjecting a beat signal generated based on a transmitted signal based on the transmitted wave and a received signal based on the reflected wave to a first fast Fourier transform process. The controller generates a second sample based on a result obtained by subjecting the first sample to a second fast Fourier transform process, and estimates an arrival direction of the reflected wave based on the second sample. The controller shall set the first sample from the beat signals in which the peak in the result obtained by performing the first fast Fourier transform process is equal to or higher than a first threshold value.

An electronic device according to an embodiment comprises a transmitting antenna that transmits a transmitted wave, a receiving antenna that receives a reflected wave obtained by reflection of the transmitted wave, and a controller. The controller generates a sample based on a result obtained by subjecting a beat signal generated based on a transmitted signal based on the transmitted wave and a received signal based on the reflected wave to a Fourier transform process. The controller estimates an arrival direction of the reflected wave based on the sample. The controller selects the sample from the beat signals in which the peak in the result obtained by performing the Fourier transform process is equal to or higher than a prescribed threshold value.

An electronic device according to an embodiment comprises a transmitting antenna that transmits a transmitted wave, a receiving antenna that receives a reflected wave obtained by reflection of the transmitted wave, and a controller. The controller generates a first sample based on a result obtained by subjecting a beat signal generated based on a transmitted signal based on the transmitted wave and a received signal based on the reflected wave to a first fast Fourier transform process. The controller generates a second sample based on a result obtained by subjecting the first sample to a second fast Fourier transform process. The controller estimates an arrival direction of the reflected wave based on the second sample. The controller selects the second sample from the beat signals in which the peak in the result obtained by performing the second fast Fourier transform process is equal to or higher than a second threshold value.

A method for controlling electronic device according to an embodiment includes the following steps.

(1) A step of transmitting a transmitted signal as a transmitted wave from a transmitting antenna.

(2) A step of receiving a received signal from a receiving antenna as a reflected wave obtained by reflection of the transmitted wave.

(3) A step of generating a first sample based on a result obtained by subjecting a beat signal generated based on the transmitted signal and the received signal to a first fast Fourier transform process.

(4) A step of selecting the beat signals from the first samples in which the peak in the result obtained by performing the first fast Fourier transform process is equal to or higher than a first threshold value, among the beat signals.

(5) A step of generating a second sample based on a result obtained by subjecting the selected first sample to a second fast Fourier transform process.

(6) A step of estimating an arrival direction of the reflected wave based on the second sample.

An electronic device control program according to an embodiment causes a computer to perform the above steps (1) through (6).

DETAILED DESCRIPTION

In the technique of measuring an arrival direction of the reflected wave as described above, it is desirable to improve the accuracy of the measurement. An objective of the present disclosure is to provide an electronic device that improves an accuracy of measuring the arrival direction of the reflected wave, a method for controlling electronic device, and an electronic device control program. According to an embodiment, it is possible to provide an electronic device that improves an accuracy of measuring the arrival direction of the reflected wave, a method for controlling an electronic device, and an electronic device control program. Hereinafter, an embodiment will be described in detail with reference to the drawings.

An electronic device according to an embodiment, for example, by being mounted on a vehicle such as an automobile (mobile body), can measure (estimate) a direction of a prescribed object existing around the mobile body. For this reason, an electronic device according to an embodiment can transmit a transmitted wave from a transmitting antenna installed on a mobile body to the surroundings of the mobile body. Also, an electronic device according to an embodiment can receive the reflected wave obtained by reflection of the transmitted wave from a receiving antenna installed on the mobile body. At least one of transmitting antennas and receiving antennas may be provided, for example, in a radar sensor or the like installed in the mobile body.

Hereinafter, as a typical example, the configuration in which an electronic device according to an embodiment is mounted in an automobile, such as a passenger car as an example of a mobile body will be described. However, mobile bodies on which the electronic device according to an embodiment is mounted is not limited to the automobile. An electronic device according to an embodiment may be mounted on a variety of mobile bodies, such as automated driving cars, buses, trucks, motorcycles, bicycles, ships, aircrafts, tractors such as agricultural vehicles, fire trucks, ambulances, police vehicles, snowplows, street sweepers, drones, and pedestrians. Further, mobile bodies on which an electronic device according to an embodiment is mounted are not necessarily limited to mobile bodies that move by their own power. For example, a mobile body on which an electronic device according to an embodiment is mounted may be a trailer portion towed by a tractor.

First, an example of detecting a body by an electronic device according to an embodiment will be described.

Figure 1:
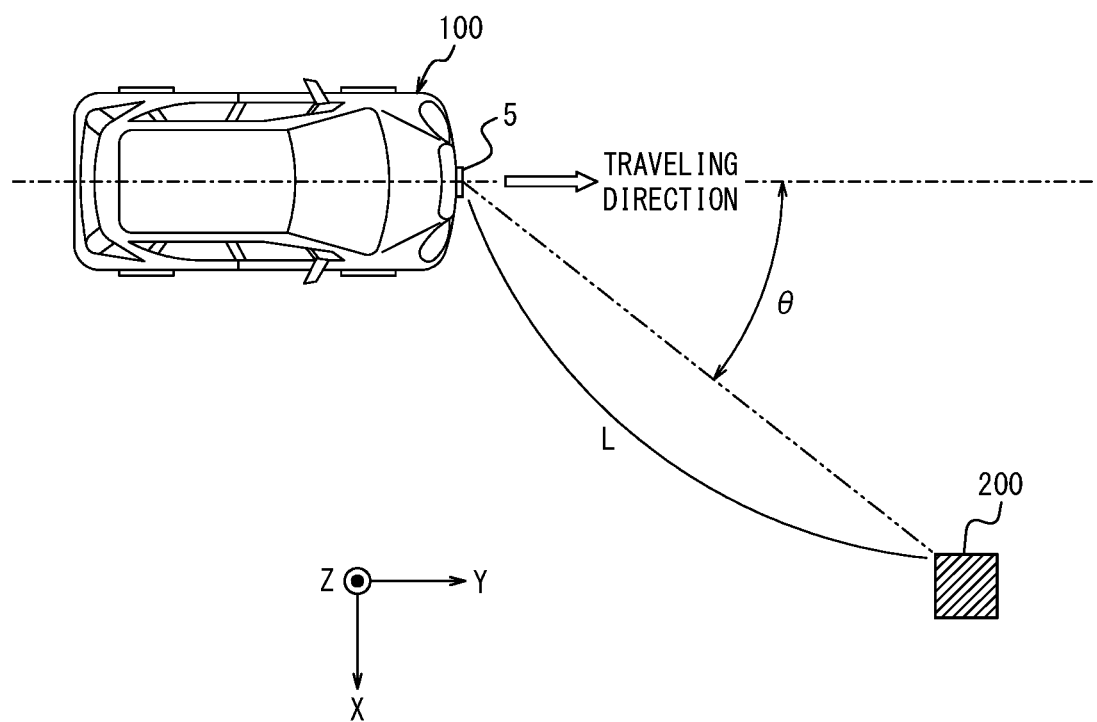
FIG. 1 is a diagram for explaining a use of an electronic device according to an embodiment.

FIG. 1 is a diagram for explaining a use of an electronic device according to an embodiment. FIG. 1 shows an example in which a sensor comprising a transmitting antenna and a receiving antenna according to an embodiment is installed on a mobile body.

In a mobile body 100 shown in FIG. 1, a sensor 5 comprising a transmitting antenna and a receiving antenna according to an embodiment is installed. Further, the mobile body 100 shown in FIG. 1 shall be equipped with an electronic device 1 according to an embodiment (for example, built-in). A specific configuration of the electronic device 1 will be described later. The sensor 5 may comprise, for example, at least one of transmitting antennas and receiving antennas. Further, the sensor 5 may include at least one of the other functional parts such as a controller 10 included in the electronic device 1 (FIG. 3), as appropriate. The mobile body 100 shown in FIG. 1 may be an automobile vehicle, such as a passenger car, but may be an arbitrary type of mobile body. In FIG. 1, the mobile body 100, for example, may be moving in the Y-axis positive direction shown in FIG. 1 (traveling direction) or (traveling or slow traveling), it may be moving in other directions, or it may be stationary without moving.

As shown in FIG. 1, the sensor 5 comprising a plurality of transmitting antennas is installed on a mobile body 100. In the example shown in FIG. 1, only one sensor 5 comprising a transmitting antenna and a receiving antenna is installed in front of the mobile body 100. Here, a position where the sensor 5 is installed in the mobile body 100 is not limited to the position shown in FIG. 1, but may be other positions as appropriate. For example, the sensor 5 as shown in FIG. 1 may be installed on the left, right, and/or rear of the mobile body 100. Further, a number of such sensors 5 may be an arbitrary number of one or more, depending on various conditions (or requirements) such as the range and/or accuracy of the measurement in the mobile body 100.

The sensor 5 transmits an electromagnetic wave as a transmitted wave from a transmitting antenna. For example, if there is a prescribed object (for example, object 200 shown in FIG. 1) around the mobile body 100, at least a part of the transmitted wave transmitted from the sensor 5 is reflected by the object and becomes a reflected wave. Then, by receiving such a reflected wave by the receiving antenna of the sensor 5 for example, the electronic device 1 mounted on the mobile body 100 can detect the object.

The sensor 5 comprising a transmitting antenna may typically be a radar (RADAR(Radio Detecting and Ranging) sensor that transmits and receives radio waves. However, the sensor 5 is not limited to a radar sensor. The sensor 5 according to an embodiment may be a sensor based on a technique of, for example, LIDAR (Light Detection and Ranging, Laser Imaging Detection and Ranging) by light waves. Such sensors can be configured to include, for example, a patch antenna. Because techniques such as RADAR and LIDAR have been already known, detailed descriptions may be simplified or omitted as appropriate.

The electronic device 1 mounted on the mobile body 100 shown in FIG. 1 receives a reflected wave obtained by reflection of the transmitted wave transmitted from a transmitting antenna of the sensor 5, from the receiving antenna. In this way, the electronic device 1 can detect a prescribed object 200 existing within a prescribed distance from the mobile body 100. For example, as shown in FIG. 1, the electronic device 1 can measure the distance L between the mobile body 100, which is its own vehicle, and the prescribed object 200. Further, the electronic device 1 can also measure the relative speed between the mobile body 100, which is its own vehicle, and the prescribed object 200. Furthermore, the electronic device 1 can also measure an arrival direction (arrival angle θ) in which a reflected wave from the prescribed object 200 arrives at the mobile body 100, which is its own vehicle.

Here, the object 200 may be at least one of, for example, oncoming vehicles traveling in a lane adjacent to the mobile body 100, vehicles traveling in parallel with the mobile body 100, and vehicles in front of or behind the mobile body 100 traveling in the same lane as the mobile body 100. The object 200 may be an arbitrary body around the mobile body 100, such as motorcycles, bicycles, strollers, pedestrians, guardrails, medians, road signs, sidewalk steps, walls, manholes, and obstacles. In the present disclosure, objects detected by the sensor 5 include inanimate objects as well as organisms such as humans or animals. The objects detected by the sensors 5 of the present disclosure include markers, including humans, objects and animals, which are detected by radar technique.

In FIG. 1, a ratio of the size of the sensor 5 to the size of the mobile body 100 does not necessarily represent an actual ratio. Further, in FIG. 1, the sensor 5 shows a state of being installed outside of the mobile body 100. However, in an embodiment, the sensor 5 may be installed in various positions on the mobile body 100. For example, in an embodiment, the sensor 5 may be installed inside of the bumper of the mobile body 100 so that it does not appear in the outer appearance of the mobile body 100. The position where the sensor 5 is installed on the mobile body 100 may be either outside or inside of the mobile body 100, or both. An inside of the mobile body 100 is, for example, an inside of the body of the mobile body 100, an inside of bumpers, an inside of headlights, or an inside of spaces in a car. An outside of the mobile body 100 is, for example, a surface of a body of the mobile body 100, a surface of bumpers, or a surface of headlights.

Hereinafter, as a typical example, the transmitting antenna of the sensor 5 will be described as transmitting radio waves in a frequency band such as millimeter wave (above 30 GHz) or quasi-millimeter wave (for example, around 20 GHz to 30 GHz). For example, the transmitting antenna of the sensor 5 may transmit radio waves with a frequency bandwidth of 4 GHz, such as 77 GHz to 81 GHz. The transmitting antenna of the sensor 5 may transmit radio waves in a frequency band other than millimeter wave (above 30 GHz) or quasi-millimeter wave (for example, near 20 GHz to 30 GHz).

Figure 2:
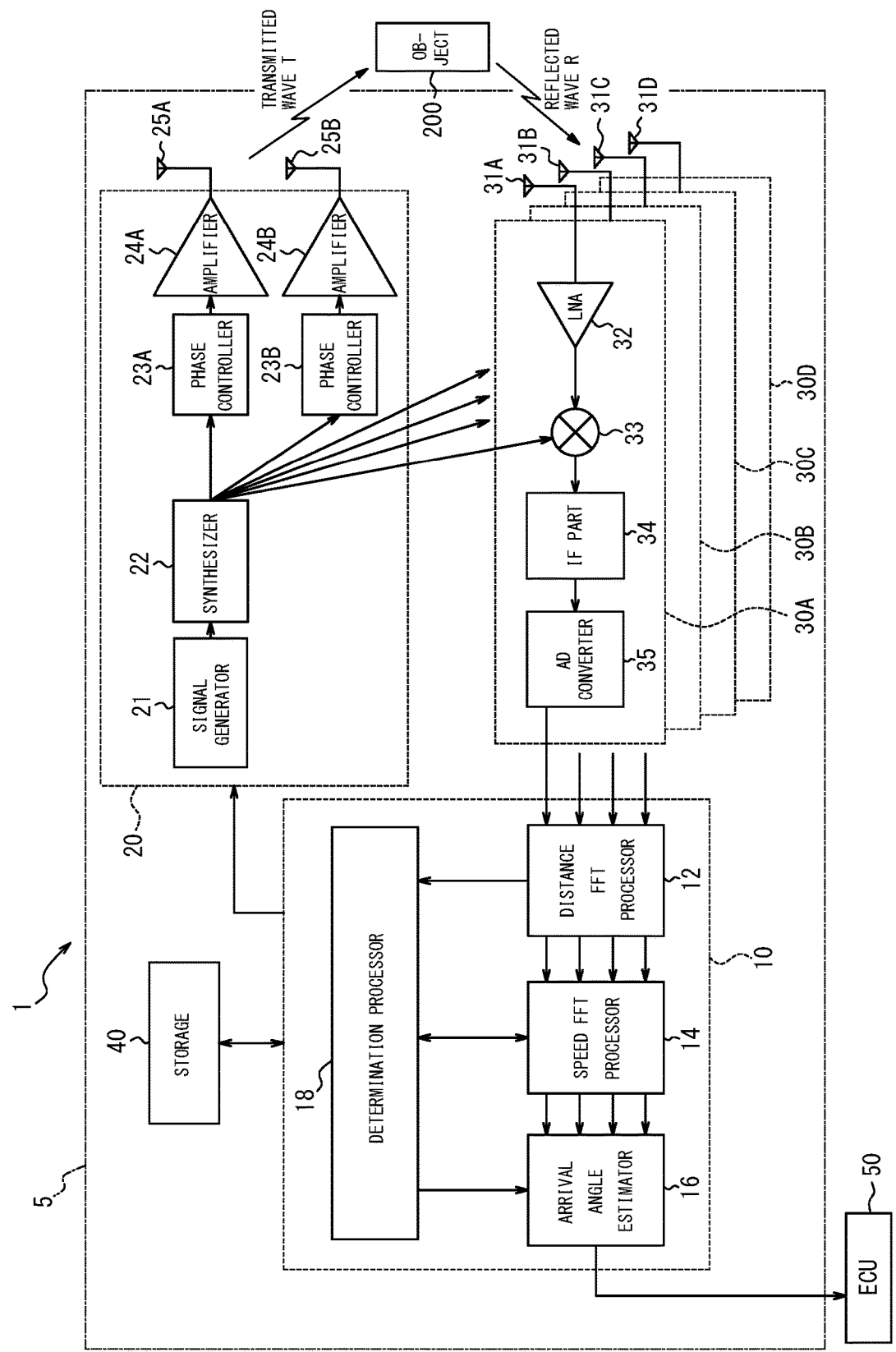
FIG. 2 is a functional block diagram schematically showing a configuration of an electronic device according to an embodiment.

FIG. 2 is a functional block diagram schematically showing an example of a configuration of the electronic device 1 according to an embodiment. Hereinafter, an example of a configuration of the electronic device 1 according to an embodiment will be described.

When measuring distance or the like by millimeter wave radar, a frequency modulated continuous wave radar (hereafter referred to as FMCW radar (Frequency Modulated Continuous Wave radar)) is often used. A FMCW radar sweeps a frequency of a radio wave to be transmitted, and thereby a transmitted signal is generated. Therefore, for example, in a millimeter wave FMCW radar that uses radio waves in the 79 GHz frequency band, the frequency of the radio waves used will have a frequency bandwidth of 4 GHz, for example, such as 77 GHz to 81 GHz. A radar in the 79 GHz frequency band is characterized by a wider usable frequency bandwidth than other millimeter/quasi-millimeter wave radars, such as those in the 24 GHz, 60 GHz, and 76 GHz frequency bands. Hereinafter, such an embodiment will be described.

As shown in FIG. 2, an electronic device 1 in an embodiment consists of the sensor 5 and an ECU (Electronic Control Unit) 50. The ECU50 controls various operations of the mobile body 100. The ECU50 may consist of at least one or more ECUs. The electronic device 1 according to an embodiment comprises the controller 10. Further, the electronic device 1 according to an embodiment may appropriately include other functional parts such as at least one of a transmitter 20, receivers 30A to 30D, and a storage 40. As shown in FIG. 2, the electronic device 1 may comprise a plurality of receivers, such as the receivers 30A to 30D. Hereinafter, when the receiver 30A, the receiver 30B, the receiver 30C, and the receiver 30D are not distinguished, they are simply referred to as "receiver 30".

As shown in FIG. 2, the controller 10 may comprise a distance FFT processor 12, a speed FFT processor 14, an arrival angle estimator 16, and a determination processor 18. These functional parts included in the controller 10 will be further described later.

The transmitter 20, as shown in FIG. 2, may comprise a signal generator 21, a synthesizer 22, phase controllers 23A and 23B, amplifiers 24A and 24B, and transmitting antennas 25A and 25B. Hereinafter, when the transmitting antenna 25A and the transmitting antenna 25B are not distinguished, they are simply referred to as "transmitting antenna 25". Further, other functional parts in the transmitter 20 may also be referred to collectively by omitting symbols such as A and B when a plurality of functional parts of the same type are not specifically distinguished, for example, such as the phase controllers 23A and 23B.

As shown in FIG. 2, the receiver 30 may comprise corresponding receiving antennas 31A to 31D, respectively. Hereinafter, when the receiving antenna 31A, the receiving antenna 31B, the receiving antenna 31C, and the receiving antenna 31D are not distinguished, they are simply referred to as "receiving antenna 31". Further, as shown in FIG. 2, a plurality of receivers 30 may comprise an LNA 32, a mixer 33, an IF part 34, and an AD converter 35, respectively. The receivers 30A to 30D may have the same configuration, respectively. In FIG. 2, as a representative example, the configuration of only the receiver 30A is schematically shown.

The above-mentioned sensor 5 may comprise, for example, the transmitting antenna 25 and the receiving antenna 31. The sensor 5 may also include at least one of the other functional parts, such as the controller 10, as appropriate.

The controller 10 comprised by the electronic device 1 according to an embodiment can control an operation of the entire electronic device 1 including an control of each functional part constituting the electronic device 1. The controller 10 may include at least one processor, such as a CPU (central processing unit), for example, in order to provide control and processing power for performing various functions. The controller 10 may be realized collectively by one processor, by several processors, or by individual processors. The processor may be realized as a single integrated circuit. An integrated circuit is also referred to as an IC (Integrated Circuit). A processor may be realized as a plurality of communicably connected integrated circuits and discrete circuits. A processor may be realized based on various other known techniques. In an embodiment, the controller 10 may be configured, for example, as a CPU and a program executed on the CPU. The controller 10 may appropriately include a memory necessary for an operation of the controller 10.

The storage 40 may store programs executed by the controller 10, results of process executed by the controller 10, and the like. Further, the storage 40 may function as a work memory for the controller 10. The storage 40 can be configured by, for example, a semiconductor memory, a magnetic disk, or the like, but is not limited to these, and can be an arbitrary storage device. Further, for example, the storage 40 may be a storage medium such as a memory card that is inserted in the electronic device 1 according to the present embodiment. Further, the storage 40 may also be an internal memory of a CPU that is used as the controller 10, as described above.

In the electronic device 1 according to an embodiment, the controller 10 can control at least one of the transmitter 20 and the receiver 30. In this case, the controller 10 may control at least one of the transmitter 20 and the receiver 30 based on various information stored in the storage 40. Further, in the electronic device 1 according to an embodiment, the controller 10 may instruct the signal generator 21 to generate signals, or may control the signal generator 21 to generate signals.

The signal generator 21 generates the signal (transmitted signal) to be transmitted as a transmitted wave T from the transmitting antenna 25 under the control of the controller 10. The signal generator 21 may assign a frequency of a transmitted signal, for example based on control by the controller 10 when generating a transmitted signal. For example, the signal generator 21 generates signals having a prescribed frequency in a frequency band, such as 77 GHz to 81 GHz, by receiving frequency information from the controller 10. The signal generator 21 may be configured to include a functional part such as a voltage controlled oscillator (VCO).

The signal generator 21 may be configured as a hardware having the function, for example, may be configured as a microcontroller and the like, or for example, may be configured as a combination of a processor such as a CPU and a program executed by the processor. Each functional part described below may also be configured as a hardware having the function, or if possible, for example, as a microcontroller, or for example, as a combination of a processor such as a CPU and a program executed by the processor.

In the electronic device 1 according to an embodiment, the signal generator 21 may generate a transmitted signal (transmitted chirp signal) such as a chirp signal. In particular, the signal generator 21 may generate the signal (linear chirp signal) in which a frequency changes periodically and linearly. For example, the signal generator 21 may generate a chirp signal in which a frequency increases periodically and linearly from 77 GHz to 81 GHz with passage of time. Further, for example, the signal generator 21 may generate the signal in which a frequency periodically repeats linear increase (up chirp) and decrease (down chirp) from 77 GHz to 81 GHz with passage of time. The signal generated by the signal generator 21 may be preset in the controller 10, for example. Further, the signal generated by the signal generator 21 may be stored in advance in a storage 40 or the like, for example. Because chirp signals used in technical fields such as radar are known, more detailed description will be simplified or omitted as appropriate. The signal generated by the signal generator 21 is supplied to the synthesizer 22.

The ECU 50 equipped with the electronic device 1 according to an embodiment can control an operation of the entire mobile body 100, including a control of each functional part comprising the mobile body 100. The ECU 50 may include at least one processor, such as a CPU (Central Processing Unit), for example, in order to provide control and processing power for performing various functions. The ECU 50 may be realized collectively by one processor, by several processors, or by individual processors. The processor may be realized as a single integrated circuit. An integrated circuit is also referred to as an IC (Integrated Circuit). A processor may be realized as a plurality of communicably connected integrated circuits and discrete circuits. A processor may be realized based on various other known techniques. In an embodiment, the ECU 50 may be configured, for example, as a CPU and a program executed on the CPU. ECU 50 may appropriately include a memory necessary for an operation of the ECU 50. Further, at least a part of a function of the controller 10 may be a function of the ECU 50, or at least a part of a function of the ECU 50 may be a function of the controller 10.

Figure 3:
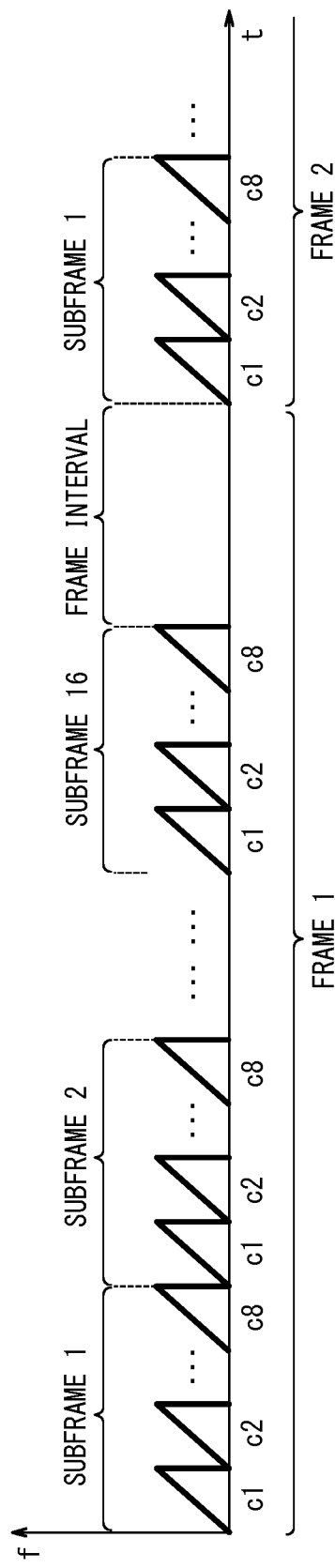
FIG. 3 is a diagram for explaining a configuration of a transmitted signal according to an embodiment.

FIG. 3 is a diagram explaining an example of a chirp signal generated by the signal generator 21.

In FIG. 3, the horizontal axis represents the passage of time, and the vertical axis represents the frequency. In the example shown in FIG. 3, the signal generator 21 generates a linear chirp signal in which a frequency changes periodically and linearly. In FIG. 3, each chirp signal is shown as c1, c2, . . . , c8. As shown in FIG. 3, in each chirp signal, a frequency increases linearly with passage of time.

In an example shown in FIG. 3, eight chirp signals such as c1, c2, . . . , C8 are included to form one subframe. That is, the subframe 1 and the subframe 2 shown in FIG. 3 are configured to include eight chirp signals such as c1, c2, . . . , C8, respectively. Further, in an example shown in FIG. 3, 16 subframes such as subframes 1 to 16 are included to form one frame. That is, one frame consists of 16 subframes respectively, such as frame 1 and frame 2 shown in FIG. 3. Further, as shown in FIG. 3, a frame interval having a prescribed length may be included between the frames.

In FIG. 3, frame 2 and beyond may have a similar configuration. Further, in FIG. 3, frame 3 and beyond may have a similar configuration. In the electronic device 1 according to an embodiment, the signal generator 21 may generate a transmitted signal as an arbitrary number of frames. Also, in FIG. 3, some chirp signals are shown omitted. Thus, a relationship between frequency and time of a transmitted signal generated by the signal generator 21 may be stored in the storage 40, for example.

Thus, the electronic device 1 according to an embodiment may transmit the transmitted signal consisting of subframes including a plurality of chirp signals. Also, the electronic device 1 according to an embodiment may transmit the transmitted signal consisting of a frame including a prescribed number of subframes.

Hereinafter, the electronic device 1 will be described as transmitting the transmitted signal having a frame structure as shown in FIG. 3. However, the frame structure as shown in FIG. 3 is an example, and a number of chirp signals included in one subframe is not limited to eight, for example. In an embodiment, the signal generator 21 may generate subframes including an arbitrary number of (for example, any plural) chirp signals. Further, the subframe structure as shown in FIG. 3 is also an example. For example, a number of subframes included in one frame is not limited to 16. In an embodiment, the signal generator 21 may generate frames including an arbitrary number of (for example, any plural) subframes.

The synthesizer 22 raises a frequency of the signal generated by the signal generator 21 to a frequency in a prescribed frequency band. The synthesizer 22 may raise a frequency of the signal generated by the signal generator 21 to a frequency selected as a frequency of the transmitted wave T that is transmitted from the transmitting antenna 25. The frequency to be selected as the frequency of the transmitted wave T that is transmitted from the transmitting antenna 25 may be set by the controller 10, for example. Further, the frequency selected as the frequency of the transmitted wave T that is transmitted from the transmitting antenna 25 may be stored in the storage 40, for example. The signal whose frequency has been raised by the synthesizer 22 is supplied to the phase controller 23 and the mixer 33. When there are a plurality of the receivers 30, the signal whose frequency has been raised by the synthesizer 22 may be supplied to each of the mixer 33 in a plurality of the receivers 30.

The phase controller 23 controls a phase of a transmitted signal supplied by the synthesizer 22. Specifically, the phase controller 23 may adjust a phase of a transmitted signal by appropriately advancing or delaying a phase of the signal supplied from the synthesizer 22 based on the control by the controller 10, for example. In this case, the phase controller 23 may adjust the phase of each transmitted signal based on the path difference of each transmitted wave T that is transmitted from a plurality of the transmitting antennas 25. By the phase controller 23 appropriately adjusting the phase of each transmitted signal, the transmitted waves T transmitted from a plurality of transmitting antennas strengthen each other in a prescribed direction to form a beam (beamforming). In this case, the correlation between the beamforming direction, and the phase amount to be controlled of the transmission signals transmitted from each of a plurality of transmission antennas 25 may be stored in the storage 40, for example. The transmitted signal whose phase is controlled by the phase controller 23 is supplied to an amplifier 24.

The amplifier 24 amplifies the power (electric power) of the transmitted signal supplied from the phase controller 23, for example, based on the control by the controller 10. Because the technique itself for amplifying the power of the transmitted signal is already known, a more detailed description will be omitted. The amplifier 24 is connected to the transmitting antenna 25.

The transmitting antenna 25 outputs (transmits) the transmitted signal amplified by the amplifier 24 as the transmitted wave T. As described above, the sensor 5 may be configured to include a plurality of transmitting antennas, for example, such as the transmitting antenna 25A and the transmitting antenna 25B. Because the transmitting antenna 25 can be configured in the same manner as the transmitting antenna used in known radar technique, a more detailed description will be omitted.

In this way, the electronic device 1 according to an embodiment can transmit a transmitted signal (for example, a transmitted chirp signal) as the transmitted wave T from the transmitting antenna 25. Here, at least one of the functional parts comprising the electronic device 1 may be housed in an enclosure of a structure that cannot be easily opened in a single enclosure. For example, it is preferable that the transmitting antenna 25, the receiving antenna 31, the amplifier 24A and the amplifier 24B are housed in an enclosure, and the enclosure cannot be easily opened. Further, here, when the sensor 5 is installed on the mobile body 100 such as an automobile, the transmitting antenna 25 may transmit the transmitted wave T to the outside of the mobile body 100 through a member such as a radar cover. In this case, the radar cover may be made of a substance that allows electromagnetic waves to pass through, such as synthetic resin or rubber. This radar cover may be, for example, a housing of the sensor 5. By covering the transmitting antenna 25 with a member such as the radar cover, it is possible to reduce risks that the transmitting antenna 25 is damaged or malfunctions due to contact with external objects.

The electronic device 1 shown in FIG. 2 comprises two transmitting antennas 25 such as the transmitting antenna 25A and the transmitting antenna 25B, and transmits the transmitted wave T by these two transmitting antennas 25. Therefore, the electronic device 1 shown in FIG. 2 is configured to include two functional parts required for transmitting the transmitted wave T from the two transmitting antennas 25, respectively. Specifically, the electronic device 1 is configured to include two phase controllers 23 such as the phase controller 23A and the phase controller 23B. Further, the electronic device 1 shown in FIG. 2 is configured to include two amplifiers 24 such as the amplifier 24A and the amplifier 24B.

The electronic device 1 shown in FIG. 2 comprises two transmitting antennas 25, but a number of transmitting antennas 25 comprised by the electronic device 1 according to an embodiment may be any plural, for example, three or more. In this case, the electronic device 1 according to the embodiment may comprise the same number of amplifiers 24 as that of the plurality of transmitting antennas 25. Further, in this case, the electronic device 1 according to an embodiment may comprise the same number of phase controllers 23 as that of the plurality of transmitting antennas 25.

The receiving antenna 31 receives the reflected wave R. The reflected wave R is the one obtained by reflection of the transmitted wave T on the prescribed object 200. The receiving antenna 31 may be configured to include a plurality of antennas, such as the receiving antenna 31A to the receiving antenna 31D. Because the receiving antenna 31 can be configured in the same manner as the receiving antenna used in the known radar technique, a more detailed description will be omitted. The receiving antenna 31 is connected to the LNA32. The received signal based on the reflected wave R received by the receiving antenna 31 is supplied to the LNA32.

The electronic device 1 according to an embodiment, can receive the reflected wave R obtained by the reflection, that the transmitted wave T, transmitted as a transmitted signal (transmitted chirp signal) such as a chirp signal, is reflected by a prescribed object 200, from a plurality of the receiving antennas 31. Thus, when the transmission chirp signal is transmitted as the transmission wave T, the received signal based on the received reflected wave R is referred to as a received chirp signal. That is, the electronic device 1 receives the received signal (for example, the received chirp signal) as the reflected wave R from the receiving antenna 31. Here, when the sensor 5 is installed on the mobile body 100 such as an automobile, the receiving antenna 31 may receive the reflected wave R from outside of the mobile body 100 through a member such as a radar cover. In this case, the radar cover may be made of a substance that allows electromagnetic waves to pass through, such as synthetic resin or rubber. This radar cover may be, for example, a housing of the sensor 5. By covering the transmitting antenna 31 with a member such as the radar cover, it is possible to reduce risks that the transmitting antenna 31 is damaged or malfunctions due to contact with external objects.

Further, when the receiving antenna 31 is installed near the transmitting antenna 25, these may be collectively configured to be included in one sensor 5. That is, one sensor 5 may include, for example, at least one transmitting antenna 25 and at least one receiving antenna 31. For example, one sensor 5 may include a plurality of transmitting antennas 25 and a plurality of receiving antennas 31. In such a case, for example, one radar sensor may be covered with a member such as one radar cover.

The LNA 32 amplifies the received signal with low noise based on the reflected wave R received by the receiving antenna 31. The LNA 32 may be used as a low noise amplifier (Low Noise Amplifier), and amplifies the received signal supplied from the receiving antenna 31 with low noise. The received signal amplified by the LNA 32 is supplied to the mixer 33.

The mixer 33 generates a beat signal by mixing (multiplying) the RF frequency received signal supplied from the LNA 32 with the transmitted signal supplied from the synthesizer 22. The beat signal mixed by the mixer 33 is supplied to an IF part 34.

The IF part 34 decreases the frequency of the beat signal to an intermediate frequency (IF (Intermediate Frequency) frequency) by performing frequency conversion on the beat signal supplied from the mixer 33. The beat signal whose frequency is decreased by the IF part 34 is supplied to the AD converter 35.

The AD converter 35 digitizes the analog beat signal supplied by the IF part 34. The AD converter 35 may be configured by any analog-to-digital conversion circuit (Analog to Digital Converter (ADC)). The beat signal digitized by the AD converter 35 is supplied to the distance FFT processor 12 of the controller 10. When there are a plurality of receivers 30, each beat signal digitized by the plurality of AD converters 35 may be supplied to the distance FFT processor 12.

The distance FFT processor 12 estimates the distance between the object 200 and the mobile body 100 equipped with the electronic device 1, based on the beat signal supplied by the AD converter 35. The distance FFT processor 12 may include, for example, a processor that performs a Fast Fourier transform. In this case, the distance FFT processor 12 may consist of an arbitrary circuit or a chip that performs the fast Fourier Transform (Fast Fourier Transform (FFT)) process. The distance FFT processor 12 and the speed FFT processor 14 may perform a discrete Fourier transform or a Fourier transform.

The distance FFT processor 12 performs FFT process on the beat signal digitized by the AD converter 35 (hereinafter, appropriately referred to as "first FFT process"). For example, the distance FFT processor 12 may perform the FFT process on a complex signal supplied from the AD converter 35. The beat signal digitized by the AD converter 35 can be represented as a time change in the signal strength (electric power). The distance FFT processor 12 performs the FFT process on such a beat signal, whereby it can be expressed as the signal strength (electric power) corresponding to each frequency. When the peak is equal to or higher than a prescribed threshold value in the result obtained by performing the first FFT process, the distance FFT processor 12 may determine that the prescribed object 200 is at a distance corresponding to the peak. The distance FFT processor 12 can estimate the distance to the prescribed object based on one chirp signal (for example, c1 shown in FIG. 3). That is, the electronic device 1 can measure (estimate) the distance L shown in FIG. 1 by performing the first FFT process. Because the technique itself for measuring (estimating) the distance to the prescribed body by performing FFT process on the beat signal is known, a more detailed description will be simplified or omitted as appropriate. Results of the first FFT process performed by the distance FFT processor 12 may be supplied to the speed FFT processor 14.

The speed FFT processor 14 estimates a relative speed between the mobile body 100 equipped with the electronic device 1 and the object 200 based on the beat signal on which the first FFT process has been performed by the distance FFT processor 12. The speed FFT processor 14 may include, for example, a processor that performs the fast Fourier transform. In this case, the speed FFT processor 14 may consist of an arbitrary circuit or a chip that performs the fast Fourier Transform (Fast Fourier Transform (FFT)) process.

The speed FFT processor 14 further performs a FFT process on the beat signal on which the first FFT process has been performed by the distance FFT processor 12 (hereinafter, appropriately referred to as "second FFT process"). For example, the speed FFT processor 14 may perform FFT process on the complex signal supplied from the distance FFT processor 12. The speed FFT processor 14 can estimate the relative speed with a prescribed object based on the subframe of the chirp signal (for example, the subframe 1 shown in FIG. 3). When the first FFT process is performed on the beat signal as described above, a plurality of vectors can be generated. The relative speed with a prescribed body can be estimated by obtaining the phase of the peak in a result obtained by performing the second FFT process on these plurality of vectors. That is, the electronic device 1 can measure (estimate) the relative speed between the mobile body 100 shown in FIG. 1 and the prescribed object 200 by performing the second FFT process. Because the technique itself for measuring (estimating) the relative speed with a prescribed body by performing the speed FFT process on the result of performing the distance FFT process is known, a more detailed explanation is appropriately simplified or omitted. The result of performing the second FFT process by the speed FFT processor 14 may be supplied to the arrival angle estimator 16.

The arrival angle estimator 16 estimates the direction in which the reflected wave R arrives from the prescribed object 200 based on the result obtained by the FFT process performed by the speed FFT processor 14. The electronic device 1 can estimate the direction in which the reflected wave R arrives by receiving the reflected wave R from the plurality of receiving antennas 31. For example, the plurality of receiving antennas 31 shall be arranged at prescribed intervals. In this case, the transmitted wave T transmitted from the transmitting antenna 25 is reflected by the prescribed object 200 to become the reflected wave R, and each of the plurality of receiving antennas 31 arranged at prescribed intervals receives the reflected wave R. Then, the electronic device 1 can estimate the direction in which the reflected wave R arrives at the receiving antenna 31 based on the phase of the reflected wave R received by each of the plurality of receiving antennas 31 and the path difference of each reflected wave R. That is, the electronic device 1 can measure (estimate) the arrival angle θ shown in FIG. 1 based on the result of performing the second FFT process. Various techniques for estimating the direction in which the reflected wave R arrives have been proposed based on the result obtained by performing the speed FFT process. Therefore, more detailed description of known techniques will be simplified or omitted as appropriate. The information (angle information) of the arrival angle θ estimated by the arrival angle estimator 16 may be output from the controller 10 to the ECU 50 or the like, for example. In this case, when the mobile body 100 is an automobile, communication may be performed using a communication interface such as CAN (Controller Area Network).

The determination processor 18 performs process for determining whether each value used in the arithmetic operation process is equal to or higher than a prescribed threshold value. For example, the determination processor 18 may determine whether the peak in the result obtained by performing a process in the distance FFT processor 12 and the speed FFT processor 14 is equal to or higher than a prescribed threshold value, respectively.

For example, the determination processor 18 may determine whether the peak in a result obtained by performing the first FFT process by the distance FFT processor 12 becomes equal to or higher than the first threshold value. That is, the determination processor 18 may determine whether the peak in a result obtained by performing the first FFT process on the beat signal generated based on the transmitted signal and the received signal becomes equal to or higher than the first threshold value. To set the first threshold value will be described later. In this way, when the peak in a result obtained by performing the first FFT process on the beat signal is determined to be equal to or higher than the first threshold value, the beat signal may be counted as the "first sample". Counting the beat signal as the "first sample" means that the determination processor 18 selects the sample in which the peak in the result obtained by performing the first FFT process on the beat signal is equal to or higher than the first threshold value.

Further, for example, the determination processor 18 may determine whether the peak in a result obtained by performing the second FFT process by the speed FFT processor 14 becomes equal to or higher than the second threshold value. That is, the determination processor 18 may determine whether the peak in a result obtained by performing the second FFT process on the above-mentioned first sample becomes equal to or higher than the second threshold value. To set the second threshold value will be described later. Thus, when the peak in a result obtained by performing the second FFT process on the first sample is determined to be equal to or higher than the second threshold value, the first sample may be counted as the "second sample". Counting the beat signal as the "second sample" means that the determination processor 18 selects the sample in which the peak in the result obtained by performing the second FFT process on the beat signal is equal to or higher than the second threshold value.

As described above, the arrival angle estimator 16 estimates the direction in which the reflected wave R arrives from the prescribed object 200 based on the result of the FFT process performed by the speed FFT processor 14. Further, the speed FFT processor 14 performs the second FFT process on the beat signal on which the first FFT process has been performed by the distance FFT processor 12. In this case, the distance FFT processor 12 may generate the first sample according to the determination process by the determination processor 18, based on the results obtained by performing the first FFT process on the beat signal generated based on the transmitted and received signals. Further, the speed FFT processor 14 may generate the second sample according to the determination process by the determination processor 18 based on the result obtained by performing the second FFT process on the first sample. Then, the arrival angle estimator 16 may estimate the arrival direction (arrival angle θ) of the reflected wave R based on the generated second sample. For example, the electronic device 1 may estimate the arrival direction (arrival angle θ) of the reflected wave R based on a covariance matrix obtained by the second sample.

The electronic device 1 shown in FIG. 2 comprises two transmitting antennas 25 and four receiving antennas 31. Thus, by comprising the plurality of transmitting antennas 25 and the plurality of receiving antennas 31, the electronic device 1 may configure these antennas as eight virtual antennas array for example. Thus, the electronic device 1 may transmit and receive the reflected wave R including 16 subframes shown in FIG. 3 by using the virtual eight antennas.

FIGS. 4 to 7 are diagrams explaining an example of an operation of the electronic device 1 according to an embodiment. Hereinafter, an example of an operation of the electronic device 1 according to an embodiment will be described. Hereinafter, an example in which the electronic device 1 is configured as a millimeter-wave type FMCW radar will be described.

Figure 4:
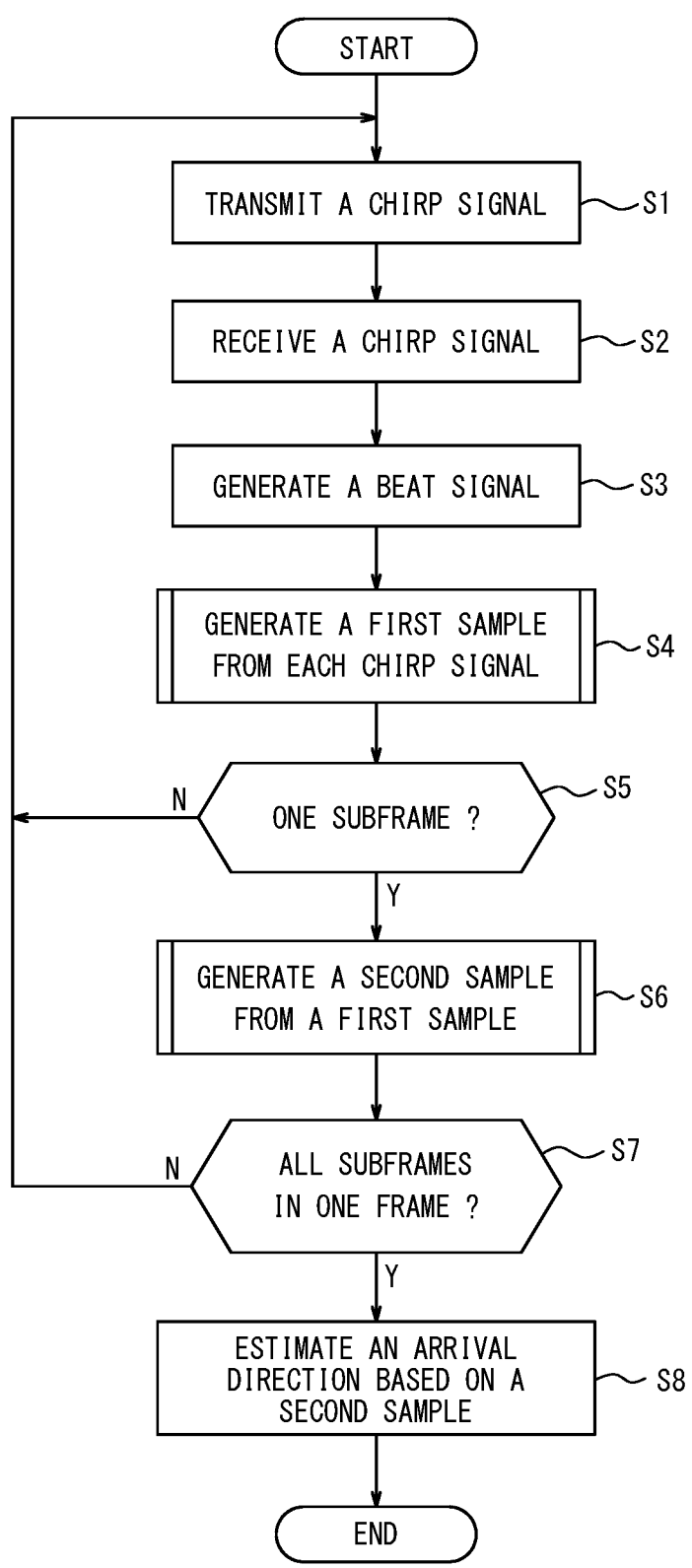
FIG. 4 is a flowchart for explaining an operation of an electronic device according to an embodiment.

FIG. 4 is a flowchart explaining an operation of the electronic device 1 according to an embodiment. The operation shown in FIG. 4 may be started when, for example, the electronic device 1 detects a prescribed object 200 existing around the mobile body 100, and estimates the direction (arrival angle θ) in which the reflected wave R arrives from the object 200.

When the operation shown in FIG. 4 starts, the controller 10 of the electronic device 1 controls to transmit the chirp signal from the transmitting antenna 25 of the transmitter 20 (step S1). Specifically, the controller 10 instructs the signal generator 21 to generate a transmitted signal (chirp signal). The controller 10 controls the chirp signal to be transmitted as a transmission wave T from the transmitting antenna 25 via the synthesizer 22, the phase controller 23, and the amplifier 24.

When the chirp signal is transmitted in step S1, the controller 10 controls to receive the chirp signal from the receiving antenna 31 of the receiver 30 (step S2). When the chirp signal is received in step S2, the controller 10 controls the receiver 30 to generate a beat signal by multiplying the transmitted chirp signal with the received chirp signal (step S3). Specifically, the controller 10 controls so that the chirp signal received from the receiving antenna 31 is amplified by the LNA 32 and multiplied with the transmitted chirp signal by the mixer 33. The process from step S1 to step S3 may be performed, for example, by adopting a known millimeter-wave FMCW radar technique.

When the beat signal is generated in step S3, the controller 10 generates the above-mentioned first sample from each generated chirp signal (step S4).

Figure 5:
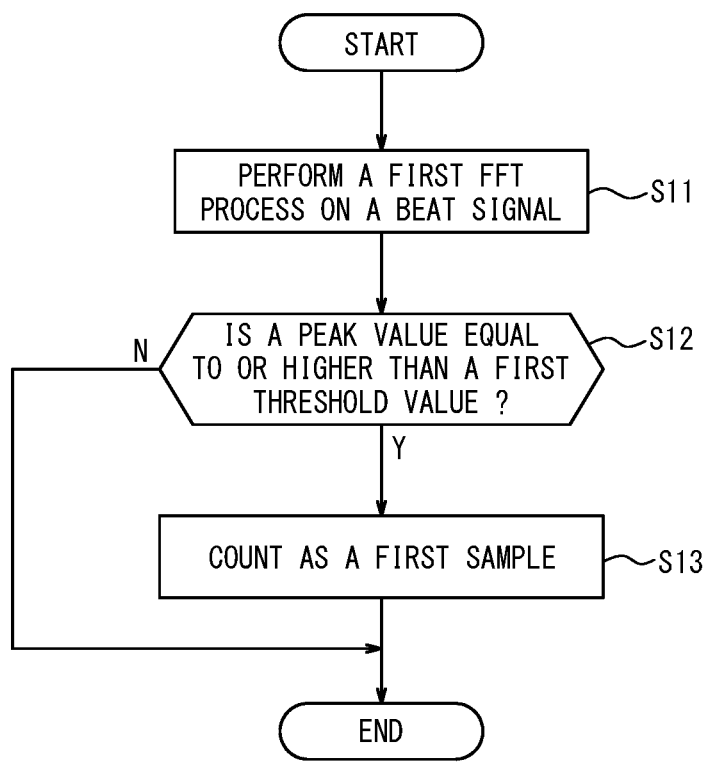
FIG. 5 is a flowchart for explaining an operation of an electronic device according to an embodiment.

Hereinafter, the process of step S4 will be further described. FIG. 5 is a flowchart explaining the process of step S4 in FIG. 4 in more detail.

When the process of step S4 shown in FIG. 4 starts, the distance FFT processor 12 performs the first FFT process on the beat signal generated in step S3 as shown in FIG. 5 (step S11). As described above, when the process of step S11 is performed, the signal strength (electric power) corresponding to each frequency can be obtained. In step S11, the distance FFT processor 12 may perform the first FFT process on the digital beat signal supplied from the AD converter 35.

When the first FFT process is performed on the beat signal in step S11, the determination processor 18 determines whether the peak in the result obtained by performing the first FFT process is equal to or higher than the first threshold value (step S12), among the generated beat signals.

Figure 6:
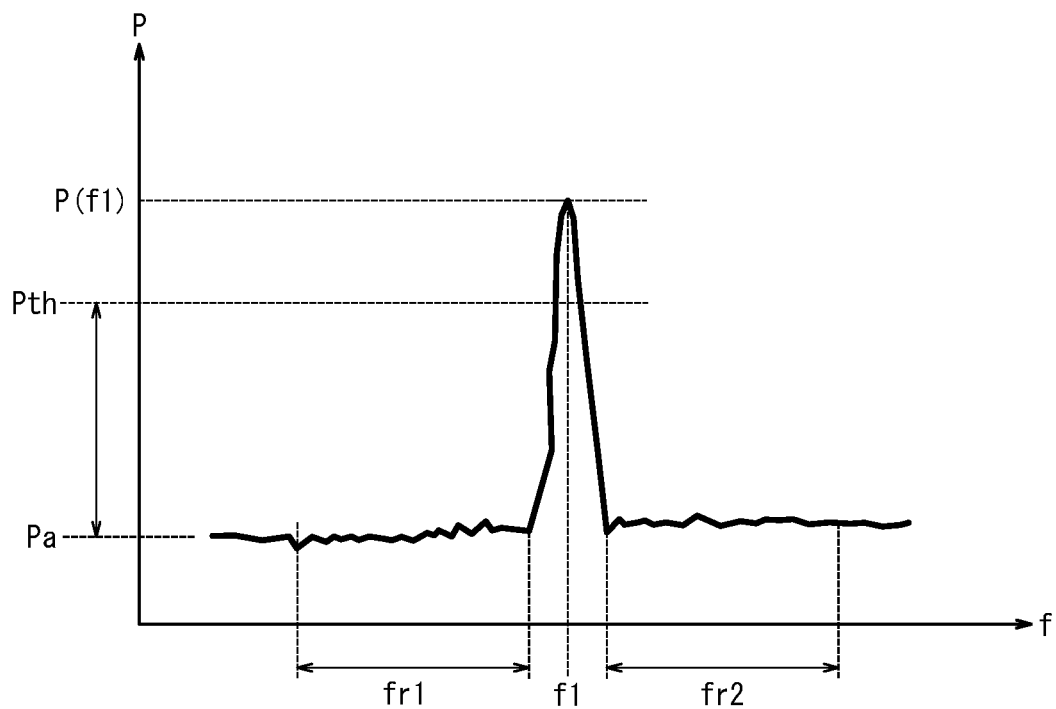
FIG. 6 is a diagram for explaining a threshold value set in an embodiment.

Here, to set the first threshold value will be described. FIG. 6 is a diagram explaining an example to set the first threshold value.

FIG. 6 is a diagram showing an example of the result of performing the first FFT process on the beat signal in step S11, for example. In FIG. 6, the horizontal axis represents the frequency f, and the vertical axis represents the signal strength (electric power) P. In the example shown in FIG. 6, when the frequency is in the region of fr1 and the frequency is in the region of fr2, the signal strength shows a value close to Pa. Further, in the example shown in FIG. 6, when the frequency is f1, the signal strength shows the peak value P (f1).

In an embodiment, the determination processor 18 sets the power threshold value Pth so that the peak value of power P (f1) can be detected for example. Here, the threshold Pth may be set based on the average value of the power when frequencies are in the region fr1 and/or the region fr2 other than the peripheral region including the frequency f1 when the electric power reaches the peak value P (f1) for example. For example, in FIG. 6, when the frequencies are in the region fr1 and/or the region fr2, the average signal strength shows a value close to Pa. Therefore, the average value of the electric power shall be Pa when frequencies are in the region fr1 and/or the region fr2 other than the peripheral region including the frequency f1 when the electric power reaches the peak value P (f1). In this case, the average value Pa of the electric power plus a prescribed value may be set as the electric power threshold value Pth. Further, when setting the electric power threshold value Pth, the guard band may be excluded in the peripheral region including the frequency f1 when the electric power reaches the peak value P (f1).

Thus, by setting the power threshold value Pth, the determination processor 18 can determine whether the peak in a result obtained by performing the first FFT process on the beat signal is equal to or higher than the first threshold value.

In step S12 shown in FIG. 5, it is determined whether the peak in a result obtained by performing the first FFT process on the beat signal is equal to or higher than the first threshold value. When it is determined in step S12 that the peak is equal to or higher than the first threshold value, the determination processor 18 performs the operation in step S13 and ends the process shown in FIG. 5. On the other hand, when it is determined in step S12 that the peak is lower than the first threshold value, the determination processor 18 ends the process shown in FIG. 5 without performing the operation in step S13.

In step S13, the determination processor 18 counts the beat signal in which the peak in the result obtained by performing the first FFT process has been determined to be equal to or higher than the first threshold value as the first sample. For example, in step S13, the determination processor 18 may store the first sample in an internal memory of the storage 40 or the controller 10 for later process. In step S11, the beat signal on which the first FFT process is performed may be a unit of, for example, one chirp signal (such as c1 shown in FIG. 3).

Therefore, in step S13, one chirp signal may be counted as the first sample.

As described above, the distance FFT processor 12 may generate the first sample from one chirp signal in step S4 shown in FIG. 4.

When the first sample is generated in step S4, the determination processor 18 determines whether the process of step S4 has been performed on all of the chirp signals included in one subframe (step S5). In step S5, the determination processor 18 may determine whether the process of step S4 has been performed on eight chirp signals (for example, c1 to c8 shown in FIG. 3) included in one subframe (for example, subframe 1 shown in FIG. 3).

When it is determined in step S5 that the process in step 4 has not yet been performed on some of the chirp signals included in one subframe, the controller 10 returns to step S1 and continues the process.

On the other hand, when it is determined in step S5 that the process in step 4 has been performed on all of the chirp signals in one subframe, the controller 10 performs the process in step S6. A case of proceeding to step S6 means that, for example, the first FFT process has been performed on all of eight chirp signals (c1 to c8) included in the subframe 1 shown in FIG. 3. Then, when proceeding to step S6, among the eight chirp signals (c1 to c8) described above, chirp signals in which the peak in the result obtained by performing the first FFT process is equal to or higher than the first threshold value are counted as the first sample.

When it is determined in step S5 that the process of step S4 has been performed on all of the chirp signals included in one subframe, the controller 10 generates the second sample described above from the generated first sample (step S6).

Figure 7:
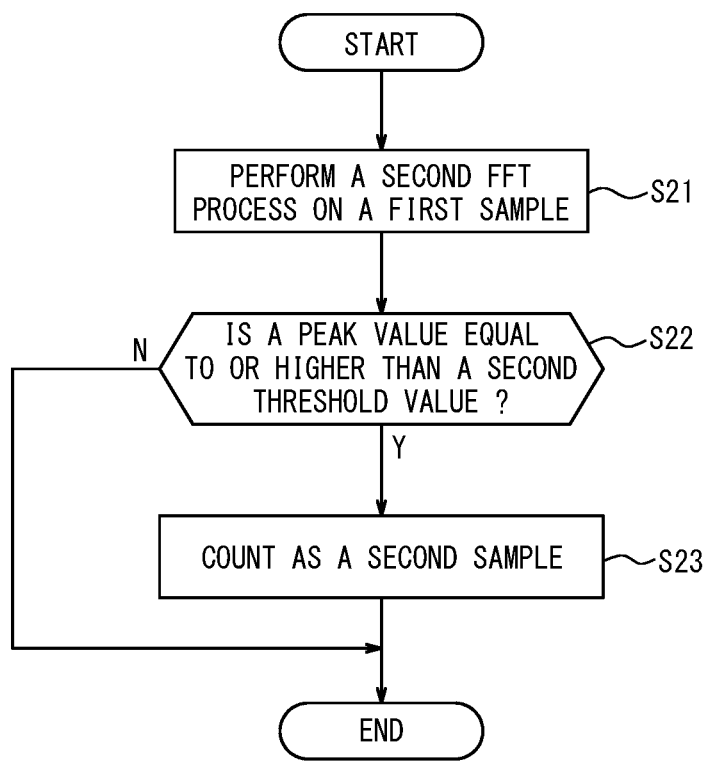
FIG. 7 is a flowchart for explaining an operation of an electronic device according to an embodiment.

Hereinafter, the process of step S6 will be further described. FIG. 7 is a flowchart explaining the process of step S6 in FIG. 4 in more detail.

When the process of step S6 shown in FIG. 4 starts, the speed FFT processor 14 performs a second FFT process on the first sample generated in step S4 as shown in FIG. 7 (step S21). In step S21, the speed FFT processor 14 may perform a second FFT process on the result obtained by the first FFT process performed by the distance FFT processor 12.

After the second FFT process is performed in step S21, the determination processor 18 determines whether the peak in the result obtained by performing the second FFT process is equal to or higher than the second threshold, among the first samples on which the second FFT process has been performed (step S22).

Figure 8:
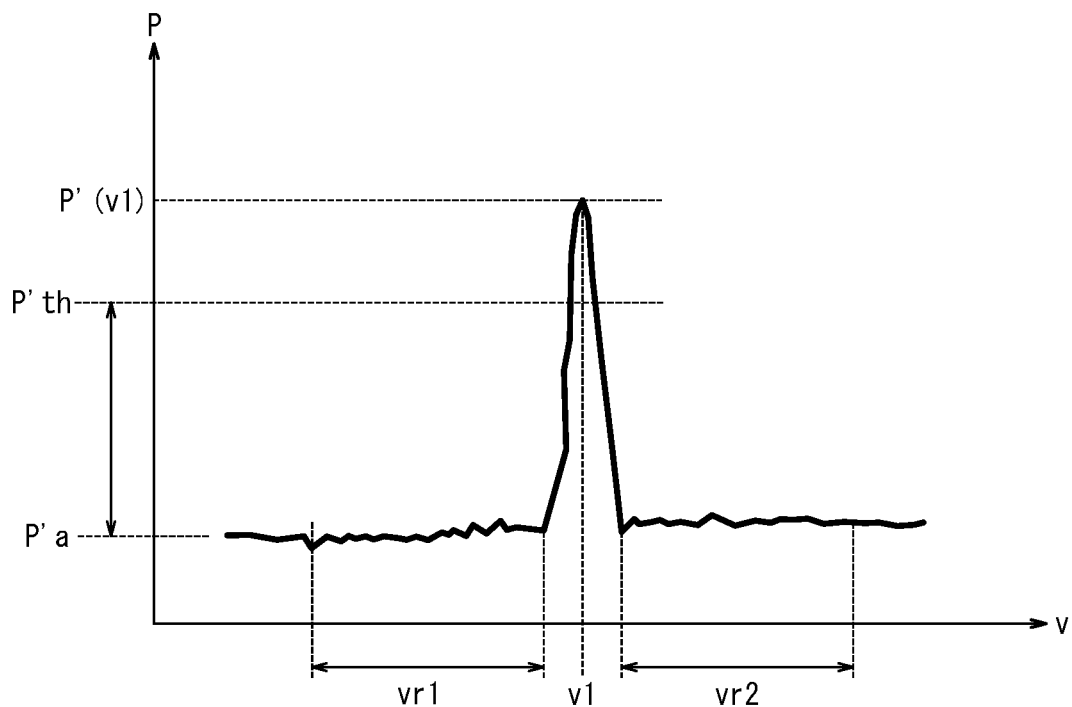
FIG. 8 is a diagram for explaining a threshold value set in an embodiment.

Here, to set the second threshold value will be described. FIG. 8 is a diagram explaining an example to set the second threshold value.

FIG. 8 is a diagram showing an example of the result obtained by performing a second FFT process on the first sample in step S21, for example. In FIG. 8, the horizontal axis represents the speed v and the vertical axis represents the signal strength (electric power) P. In the example shown in FIG. 8, when the speed is in the region of vr1 and the speed is in the region of vr2, the signal strength shows a value close to P'a. Further, in the example shown in FIG. 8, when the speed is v1, the signal strength shows the peak value P'(v1).

In an embodiment, the determination processor 18 sets the power threshold value P'th so that, for example, the peak value P'(v1) of the electric power can be detected. Here, the threshold value P'th may be set based on, for example, the average value of the electric power in the region vr1 and/or the region vr2 other than the peripheral region including the speed v1 when the electric power reaches the peak value P' (v1). For example, in FIG. 8, when the speed is in the region vr1 and/or the region vr2, the average signal strength shows a value close to P'a. Therefore, the average value of the electric power in the region vr1 and/or the region vr2 other than the peripheral region including the speed v1 when the electric power reaches the peak value P'(v1) be P'a for example. In this case, the average value of power P'a plus a prescribed value may be set as the power threshold value P'th. Further, when setting the power threshold value P'th, a guard band may be removed in the peripheral region including the speed v1 when the electric power reaches the peak value P'(v1).

Thus, by setting the power threshold value P'th, the determination processor 18 can determine whether the peak in a result obtained by performing the second FFT process on the first sample is equal to or higher than the second threshold value.

In step S22 shown in FIG. 7, it is determined whether the peak in a result obtained by performing the second FFT process on the first sample is equal to or higher than the second threshold value. When it is determined in step S22 that the peak is equal to or higher than the second threshold value, the determination processor 18 performs the operation in step S23 and ends the process shown in FIG. 7. On the other hand, when it is determined in step S22 that the peak is lower than the second threshold value, the determination processor 18 ends the process shown in FIG. 7 without performing the operation in step S23.

In step S23, the determination processor 18 counts the first sample in which the peak in the result obtained by performing the second FFT process has been determined to be equal to or higher than the second threshold value as the second sample. For example, in step S23, the determination processor 18 may store the second sample in an internal memory of the storage 40 or the controller 10 for later process. In step S21, the first sample on which the second FFT process is performed may use chirp signals (for example, c1 to c8 shown in FIG. 3) included in one subframe as a unit, for example. Therefore, the chirp signal included in one subframe may be used as a unit to be counted as the second sample in step S23.

As described above, the speed FFT processor 14 generates the second sample from the chirp signal included in one subframe in step S6 shown in FIG. 4.

When the second sample is generated in step S6, the determination processor 18 determines whether the process of step S6 has been performed on the chirp signals in all of the subframes included in one frame (step S7). In step S7, the determination processor 18 may determine whether the process in step S6 has been performed on all of the chirp signals in the 16 subframes (subframe 1 to subframe 16 shown in FIG. 3) included in one frame (for example, frame 1 shown in FIG. 3).

If it is determined in step S7 that the process in step S6 has not yet been performed on some of the chirp signals included in one frame, the controller 10 returns to step S1 and continues the process.

On the other hand, when it is determined in step S7 that the process in step S6 has been performed on the chirp signals in all of the subframes included in one frame, the controller 10 performs the process in step S8. A case of proceeding to step S8 means, for example, that the second FFT process has been performed on the 16 subframes (subframe 1 to subframe 16) included in frame 1 shown in FIG. 3. Then, when proceeding to step S8, among the first samples included in the 16 subframes described above, the first samples in which the peak in the result obtained by performing the second FFT process is equal to or higher than the second threshold value are counted as the second sample.

In step S8, the arrival angle estimator 16 estimates the arrival direction (arrival angle θ) of the reflected wave R based on the generated second sample (step S8). In step S8, the arrival angle estimator 16 may estimate the arrival direction of the reflected wave R based on, for example, the covariance matrix obtained by the second sample.

For example, the covariance matrix for estimating the arrival direction (angle of arrival θ) may be obtained using the complex signal (cx) of the peak of the second sample in which the peak in the result obtained by performing the second FFT process in one frame (16 subframes) of the transmitted signal described above is equal to or higher than the second threshold. In this case, an arithmetic operation of the covariance matrix cr may be performed, for example, according to the following equation (1):

$$cr(k, l) = \frac{1}{N} \sum_{n=1}^{N} (cx(k, n) * conj(cx(l, n))) \qquad \text{(Equation 1)}$$

Here, cx represents the complex signal of the peak after the speed Fourier transform, and conj (cx) represents the conjugate complex number of cx. Further, k and l represent the antenna numbers, and N represents the number of samples in the covariance matrix.

As described above, the electronic device 1 according to an embodiment estimates the arrival direction (arrival angle θ) of the reflected wave R based on the transmitted signal and the received signal. The electronic device 1 according to an embodiment may generate the first sample based on the result obtained by performing the first FFT process on the beat signal generated based on the transmitted signal and the received signal. Here, the first sample may be, for example, a set of chirp signals. Further, the electronic device 1 according to an embodiment may generate the second sample based on the result of performing the second FFT process on the first sample. Here, the second sample may be, for example, a set of subframes. Then, the electronic device 1 according to an embodiment can estimate the arrival direction (arrival angle θ) of the reflected wave R based on the second sample. Here, the electronic device 1 may estimate the arrival direction of the reflected wave R based on the covariance matrix obtained by the second sample. Further, the electronic device 1 according to an embodiment may estimate the arrival direction (arrival angle θ) of the reflected wave R based on the covariance matrix obtained by the second sample.

Further, as described above, among the generated beat signals generated based on the transmitted signal and the received signal, the first sample may be one in which the peak in the result obtained by performing the first FFT process is equal to or higher than the first threshold value. Here, the first threshold value may be set based on an average of power (electric power) corresponding to a region excluding the prescribed region including the peak in a result obtained by performing the first FFT process.

Further, as described above, among the first samples, the second sample may be one in which the peak in the result obtained by performing the second FFT process is equal to or higher than the second threshold value. Here, the second threshold value may be set based on an average of power (electric power) corresponding to a region excluding the prescribed region including the peak in the result obtained by performing the second FFT process.

That is, the electronic device 1 according to an embodiment performs the speed Fourier transform process using a plurality of (for example, eight) chirp signals on a distance in which the peak in a result obtained by performing the distance Fourier transform process is equal to or higher than the threshold value. Further, the electronic device 1 according to an embodiment counts how many subframes, having the speed at which the peak in the result obtained by performing the speed Fourier transform process is equal to or higher than the threshold value, lasts. Thus, the electronic device 1 according to an embodiment estimates the arrival direction of the reflected wave by obtaining the correlation matrix using the complex signal in which the peak in the result obtained by performing the speed Fourier transform is equal to or higher than the threshold value.

According to an embodiment of the electronic device 1, the accuracy of measuring the arrival direction (arrival angle θ) of the reflected wave R can be improved.

When the arrival direction (angle of arrival θ) of the reflected wave R obtained by the reflection, that the transmitted wave T is reflected by a prescribed object, is estimated by using the conventional radar technique, the error in the angle estimation may become large. In particular, when a plurality of reflecting bodies exist in the range having the same distance and the same relative speed, the angle estimation error of the arrival angle θ becomes large. Further, recently, the research has been conducted to apply an eigenspace analysis, such as MUSIC (MUltiple SIgnal Classification), to an array radar, which estimates the direction of the arrival waves incoming to the array antenna with high angular resolution. However, according to such a method, the larger the noise, the larger the detection error.

On the other hand, according to an embodiment of the electronic device 1, the noise can be removed before calculation using an algorithm such as the MUSIC, for example. Therefore, according to an embodiment of the electronic device 1, the estimation error of the arrival direction of the reflected wave R can be reduced.

Further, according to an embodiment of the electronic device 1, when the peak in the result obtained by performing the second FFT process for obtaining the relative speed is equal to or higher than the second threshold, it is adopted as the second sample. Therefore, according to an embodiment of the electronic device 1, interference waves from the objects other than those existing in the range having the same distance and the same relative speed can be reduced.

Further, according to an embodiment of the electronic device 1, a plurality of samples are used for the covariance matrix, that is calculated when estimating the arrival direction of the reflected wave R. Therefore, according to the embodiment of the electronic device 1, even when a plurality of objects exist at the same time in the range having the same distance and the same relative speed, the arrival direction of the reflected wave R from each of the objects can be estimated.

Also, in general, when the arrival direction of the reflected wave R from the object with a high relative speed is estimated by using the radar technique, the object does not necessarily exist in the distance range during transmitting and receiving the chirp signal for obtaining the covariance matrix. According to an embodiment of the electronic device 1, the arrival direction of the reflected wave R from the object is estimated by adopting only the signal in the distance range. Therefore, according to an embodiment of the electronic device 1, the influence of noise and/or interference can be reduced in estimating the arrival direction of the reflected wave R. Here, "that distance" described above is the distance indicated by the step of the distance FFT. When the relative speed between the object 200 and the sensor 5 is fast, the object 200 may move from that distance step to the next distance step during all subframe time. In this case, the object does not exist in the distance range during transmitting and receiving the chirp signal for obtaining the covariance matrix.

Next, other embodiments will be described.

In the embodiment described above, among the beat signals generated based on the transmitted and the received signals, only the ones in which the peak in the result obtained by performing the first FFT process is equal to or higher than the first threshold value are considered as the first samples. Further, in the embodiment described above, among the first samples, only the ones in which the peak in the result obtained by performing the second FFT process is equal to or higher than the second threshold value are considered as the second samples. However, in an embodiment, for example, when there are one or more prescribed number of beat signals, among the generated beat signals, in which the peak in the result obtained by performing the first FFT process is equal to or higher than the first threshold value, the first sample may be all of the beat signals in subframes that include the beat signal. Further, in an embodiment, for example, when there are one or more prescribed number of beat signals, among the generated first samples, in which the peak in the result of performing the second FFT process is equal to or higher than the second threshold value, the second sample may be all of the first samples in subframes that include the first samples.

Thus, in an embodiment, when there are any beat signals in which the peak in the result obtained by performing the first fast Fourier transform process is equal to or higher than a first threshold value, the first samples may be all of beat signals in subframes that include the beat signal. Further, in an embodiment, when there are any first samples in which the peak in the result obtained by performing the second FFT process is equal to or higher than the second threshold value, the second sample may be all of first samples in frames that include the first sample.

The present disclosure has been described based on the drawings and examples, but it should be noted that those skilled in the art will find it easy to make various transformations or modifications based on the present disclosure. Therefore, it should be noted that these transformations or modifications are included in the scope of this disclosure. For example, the functions and the like included in each functional part can be rearranged in a logically consistent manner. A plurality of functional parts and the like may be combined together or divided into one. Each of the embodiments described above according to the present disclosure is not limited to faithful implementation of the each embodiment described above, and may be implemented by appropriately combining the features together or omitting a part thereof. That is, the contents of the present disclosure can be transformed and modified by those skilled in the art based on the present disclosure. Therefore, these transformations and modifications are within the scope of this disclosure. For example, in each embodiment, each functional part, each means, each step and the like are added to other embodiments in a logically consistent manner, or can be replaced with each functional part, each means, each step and the like of other embodiments. Further, in each embodiment, it is possible to combine a plurality of each functional part, each means, each step, and the like into one or divide them. Further, each embodiment of the present disclosure described above is not limited to faithful implementation of each described embodiment, and may be implemented by combining each feature together or omitting some of them, as appropriate.

The above-described embodiment is not limited to the embodiment as the electronic device 1. For example, the above-described embodiment may be implemented as the control method for the device such as the electronic device 1. Further, for example, the above-described embodiment may be implemented as the control program for the device such as the electronic device 1.

The electronic device 1 according to an embodiment may comprise, for example, only the controller 10 as the minimum configuration. On the other hand, in addition to the controller 10, the electronic device 1 according to an embodiment may be configured to include at least one of the signal generator 21, the synthesizer 22, the phase controller 23, the amplifier 24, and the transmitting antenna 25, as shown in FIG. 3, as appropriate. The electronic device 1 according to an embodiment may also be configured to include at least one of the receiving antenna 31, the LNA 32, the mixer 33, the IF part 34, and the AD converter 35, as appropriate, in place of or together with the functional parts described above. The electronic device 1 according to an embodiment may be configured to further include the storage 40. As described above, the electronic device 1 according to an embodiment can adopt various configuration modes. Further, when the electronic device 1 according to an embodiment is mounted on the mobile body 100, for example, at least one of the above-mentioned functional parts may be installed in any appropriate places such as inside of the mobile body 100. On the other hand, in an embodiment, for example, at least one of the transmitting antenna 25 and the receiving antenna 31 may be installed outside of the mobile body 100.

REFERENCE SIGNS LIST

1 Electronic device
5 Sensor
10 Controller
12 Distance FFT processor
14 Speed FFT processor
16 Arrival angle estimator
18 Determination processor
20 Transmitter
21 Signal generator
22 Synthesizer
23 Phase controller
24 Amplifier
25 Transmitting antenna
30 Receiver
31 Receiving antenna
32 LNA
33 Mixer
34 IF part
35 AD converter
40 Storage
50 ECU
100 Mobile body
200 Object (Body)

The invention claimed is:

1. An electronic device, comprising:
a transmitting antenna that transmits a transmitted wave;
a receiving antenna that receives a reflected wave obtained by reflection of the transmitted wave; and
a controller configured to:
generate a first sample based on a result obtained by subjecting a beat signal generated based on a transmitted signal based on the transmitted wave and a received signal based on the reflected wave to a first fast Fourier transform process;
generate a second sample based on a result obtained by subjecting the first sample to a second fast Fourier transform process; and
estimate an arrival direction of the reflected wave based on the second sample,
wherein in generating the first sample, the controller is configured to set the first sample from the beat signals in which a peak in the result obtained by performing the first fast Fourier transform process is equal to or higher than a first threshold value.

2. The electronic device, according to claim 1, wherein the transmitted signal consists of subframes including a plurality of chirp signals.

3. The electronic device, according to claim 2, wherein the transmitted signal consists of frames including a prescribed number of the subframes.

4. The electronic device, according to claim 1, wherein in generating the first sample, the controller is configured to set the first sample from all of the beat signals in subframes that include any beat signals in which a peak in a result obtained by performing the first fast Fourier transform process is equal to or higher than a first threshold value, among the beat signals in the subframes, and each of the subframes includes a plurality of the beat signals.

5. The electronic device, according to claim 1, wherein the first threshold value is set based on an average of power (electric power) corresponding to a region excluding a prescribed region including the peak.

6. The electronic device, according to claim 1, wherein the controller is further configured to generate the second samples from the first samples in which a peak in a result obtained by performing the second fast Fourier transform process is equal to or higher than a second threshold value.

7. The electronic device, according to claim 1, wherein the controller is further configured to generate the second samples from all of the first samples in frames that include the first samples when any of the first samples in the frames include a peak in a result obtained by performing the second fast Fourier transform process that is equal to or higher than a second threshold value.

8. The electronic device, according to claim 6, wherein the second threshold value is set based on an average of power (electric power) corresponding to a region excluding a prescribed region including the peak.

9. The electronic device, according to claim 1, wherein the controller estimates an arrival direction of the reflected wave based on a covariance matrix obtained by the second sample.

10. A method for controlling electronic device, including:
a step of transmitting a transmitted signal as a transmitted wave from a transmitting antenna;
a step of receiving a received signal from a receiving antenna as a reflected wave obtained by reflection of the transmitted wave;
a step of generating a first sample based on a result obtained by subjecting a beat signal generated based on the transmitted signal and the received signal to a first fast Fourier transform process;
a step of selecting the beat signals from the first samples in which a peak in a result obtained by performing the first fast Fourier transform process is equal to or higher than a first threshold value, among the beat signals;
a step of generating a second sample based on a result obtained by subjecting the selected first sample to a second fast Fourier transform process; and
a step of estimating an arrival direction of the reflected wave based on the second sample.

11. A non-transitory computer-readable recording medium storing computer program instructions, which when executed by an electronic device, cause a computer to:

transmit a transmitted signal as a transmitted wave from a transmitting antenna;

receive a received signal from a receiving antenna as a reflected wave obtained by reflection of the transmitted wave;

generate a first sample based on a result obtained by subjecting a beat signal generated based on the transmitted signal and the received signal to a first fast Fourier transform process;

select the beat signals from the first samples in which a peak in a result obtained by performing the first fast Fourier transform process is equal to or higher than a first threshold value, among the beat signals;

generate a second sample based on a result obtained by subjecting the selected first sample to a second fast Fourier transform process; and estimate an arrival direction of the reflected wave based on the second sample.

12. An electronic device, comprising:

a transmitting antenna that transmits a transmitted wave;

a receiving antenna that receives a reflected wave obtained by reflection of the transmitted wave; and a controller configured to:

generate a sample based on a result obtained by subjecting a beat signal generated based on a transmitted signal based on the transmitted wave and a received signal based on the reflected wave to a Fourier transform process; and estimate an arrival direction of the reflected wave based on the sample, wherein in generating the sample, the controller is configured to select the sample from the beat signals in which a peak in a result obtained by performing the Fourier transform process is equal to or higher than a prescribed threshold value, among the beat signals.

13. An electronic device, comprising:

a transmitting antenna that transmits a transmitted wave;

a receiving antenna that receives a reflected wave obtained by reflection of the transmitted wave; and a controller configured to:

generate a first sample based on a result obtained by subjecting a beat signal generated based on a transmitted signal based on the transmitted wave and a received signal based on the reflected wave to a first fast Fourier transform process;

generate a second sample based on a result obtained by subjecting the first sample to a second fast Fourier transform process; and estimate an arrival direction of the reflected wave based on the second sample, wherein in generating the second sample, the controller is configured to select the second sample from the beat signals in which a peak in a result obtained by performing the second fast Fourier transform process is equal to or higher than a second threshold value.

* * * * *